March 25, 1947.  J. R. MILES  2,417,942
TRIPLET OBJECTIVE LENS
Filed Sept. 3, 1943
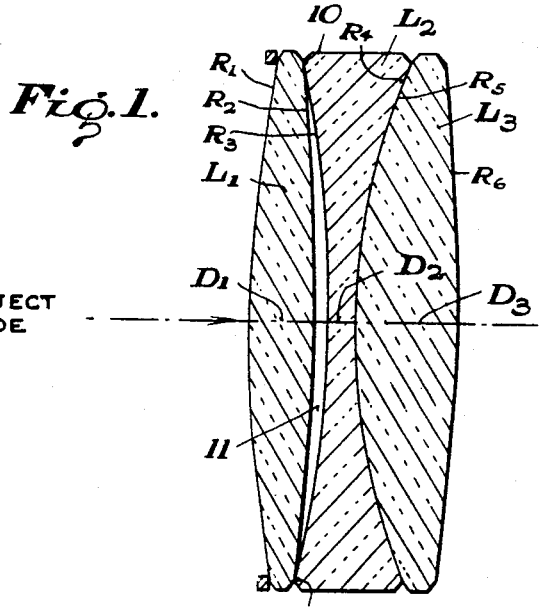
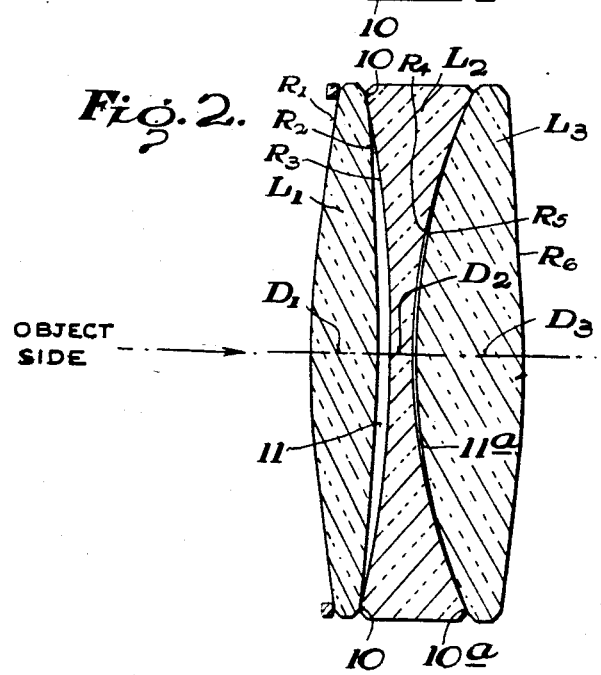
Inventor
John R. Miles,
ATTORNEY Patented Mar. 25, 1947

2,417,942

UNITED STATES PATENT OFFICE 2,417,942

TRIPLET OBJECTIVE LENS

John R. Miles, West Englewood, N. J., assignor to Bendix Aviation Corporation, Teterboro, N. J., a corporation of Delaware Application September 3, 1943, Serial No. 501,161

8 Claims. (Cl. 88—57)

This invention relates to an optical objective and particularly to compound objectives designed for substantial maximum correction of optical defects.

Hitherto in the telescope art or the like, in order to obtain substantial maximum correction of aberrations, it has been necessary to increase the overall length of the telescope. It is, therefore, an object of the present invention to provide a novel concentrated objective, whereby maximum correction and reduction of such optical defects may be obtained.

Another object of the present invention is to provide a novel improved objective having components designed to provide substantial and stable correction for both zonal aberrations and Petzval condition.

Another object is to provide a novel objective corrected for visual purposes, whereby spherical aberrations, coma, chromatism and Petzval conditions are substantially reduced and/or eliminated.

Another object is to provide novel means, whereby an objective for visual purposes corrects both chromatic and spherical aberrations, as well as coma, by combining a plurality of components composed of certain materials in a novel relation to each other, so as to yield refraction without substantial amounts of such optical defects as coma, secondary spherical aberration and curvature of field.

Another object is to provide a novel objective composed of components so shaped, so proportioned and so positioned as to produce a relatively short equivalent focal length and to correct for optical errors with a minimum of component parts.

Another object is to provide a novel visual objective by means of a novel combination of lenses, whereby corrections and resulting phenomena are accomplished at an "f ratio" which is much faster than hitherto practical with telescope objectives.

Yet another object is to provide a novel visual objective, whereby the combination of components to correct for the above mentioned optical defects may be simply manufactured and assembled at relatively minimum expense.

The above and other objects and advantages of the present invention will appear more fully hereinafter from a consideration of the detailed description which follows, taken together with the accompanying drawings wherein one embodiment of the invention is illustrated. It is to be expressly understood, however, that the drawings are for the purpose of illustration only and are not designed as a definition of the limits of the invention. Reference for this latter purpose should be had to the appended claims.

In the drawings, wherein like reference characters refer to like parts throughout the several views, Figure 1 is a side axial section view of the compound objective, such as used for one embodiment of the invention.

Figure 2 is a side axial section view of another form of the compound objective, wherein two airspaces are provided.

In the drawing, Figure 1, is illustrated one embodiment of the present invention, wherein the three components used are generally referred to as $L_1$, $L_2$, and $L_3$, designed, shaped and proportioned according to the following formula, in which the kinds of glass of the lenses $L_1$, $L_2$ and $L_3$ are determined by the refractive indices $N_D$ and the Abbé V Nos. of the line D of the solar spectrum:

| Lens | Radii | Thickness | Refractive Index $-N_D$ | V |
|---|---|---|---|---|
| Component $L_1$ (Biconvex) | $R_1 = + 80.51$<br>$R_2 = -132.20$ | $D_1 = 3.81$ | 1.6110 | 58.8 |
| Component $L_2$ (Biconcave) | $R_3 = - 74.72$<br>$R_4 = + 38.16$ | $D_2 = 1.79$ | 1.5795 | 41.0 |
| Component $L_3$ (Biconvex) | $R_5 = + 38.16$<br>$R_6 = -125.28$ | $D_3 = 6.13$ | 1.6110 | 58.8 |

Overall outside diameter 32.12; free aperture 30.30.
Equivalent focal length $f_0 = 100$; edge contact at diameter 31.51.

In the above formula, R is the radius of curvature of the refracting surface, D is the axial thickness of the lens element between the refracting surfaces, and the Abbé number V is the wellknown reciprocal dispersion-ratio. An axial separation of lens elements $L_1$ and $L_2$ results from the specified different curvatures of their adjacent refracting surfaces which are in the stated contact at their peripheral edges.

The above formula gives zonal spherical aberration about one-half as large as for most telescope objectives when the marginal to paraxial spherical aberration is fully corrected and gives simultaneous correction of coma together with better correction of chromatic aberration. As a result of such corrections the field is much flatter, astigmatism is lower and by virtue of the limited edge or line-like contact at point 31.51 between components L₁ and L₂, this objective is easy to manufacture.

For example, in the manufacture of prior three lens telescope objectives of large aperture and of at all comparable performance, an annular spacer or liner and, usually, very precise beveling with lens grinding apparatus is required to obtain the desired specifications, whereas in the present device this is eliminated by a line-like contact at point 10, to produce meniscus air space 11.

Figure 2 is another form of the objective, wherein an air space 11ª is provided between lenses L₂ and L₃ from contact point 10ª in addition to meniscus air space 11, e. g., by slightly lengthening radius R₅.

The function of the parts

Most of the refractive power of the objective is in the first biconvex lens L₁. This lens L₁ is formed, so as to produce a minimum of each of the various aberrations and the second pair of lenses, L₂ and L₃, which have very little image focusing power assembled, are designed and placed to correct the aberrations. This correction is accomplished in a very complex manner, some of the simplified portions of which are described below with reference to Figure 1.

The first concave surface of the lens L₂ forms an air space 11 of a meniscus form by contact at 10 with lens L₁. This air space is the principal, but not total, means contributing to the correcting of spherical aberration and coma (sine condition). The two surfaces of lenses L₁ and L₂ forming the air space 11, also contribute to the chromatic aberration correction, but most of the chromatic correction is accomplished by the adjacent curves of the last two contacting lenses L₂ and L₃.

The reduction of the Petzval curvature is brought about by the choice of glass. This choice is made by using the quantity $$\frac{1}{V_A - V_B}\left(\frac{V_A}{N_A} - \frac{V_B}{N_B}\right)$$

where the N's represent the indices of refraction of the glasses, the V's represent the values of the reciprocal dispersive ratios for the two glasses used and the subscripts A and B refer to the particular glass used and actually refer to the Fraunhofer spectrum lines in the solar spectrum, which are always used as the standards of wavelengths for these index measurements.

In order that the best known "new" glasses can be used to best advantage to reduce the Petzval curvature of the image field, the center negative lens L₃ is constructed of glass of a lower index of refraction than the front positive lens L₁ and the positive rear lens L₂, thereby using the largest possible difference of V in the two glasses used corresponding to as little difference in V/N of the two glasses as possible, so that the Petzval radius of field curvature is at least 1.5 times the focal length of the complete objective, where V is the reciprocal dispersion ratio and N is the index of refraction of the glasses.

Thus by a novel positioning of a minimum number of lens members composed of glass chosen according to a formula of predetermined optical values a composite objective is easily and inexpensively manufactured, that will correct most major optical errors, so as to permit instruments, such as telescopes to be made small and compact and will not require added overall length, or the like to obtain such corrections.

Although the present invention is only described and illustrated in detail for two embodiments thereof, it is to be expressly understood that the same is not limited thereto. Various changes may be made in design and arrangement of the objective illustrated, as will now be apparent to those skilled in the art. Where edge contact is referred to in the claims, this is to be understood as including cases where the surfaces R₄ and R₅ are cemented together and also where such thin pieces, e. g., of tinfoil are inserted between adjacent surfaces as not to affect the optical characteristics of the latter. For a definition of the limits of the invention, reference should be had to the appended claims.

What is claimed is:

1. An optical objective substantially as follows: equivalent focal length F=100; maximum relative free aperture=F/3.3; contact of all adjacent edges at diameter 31.51; and

| Radii | Thickness | Refractive Index—N_D | Reciprocal Dispersion— Ratio—V |
|---|---|---|---|
| $R_1= +80.51$ | $D_1=3.81$ | 1.6110 | 58.8 |
| $R_2= -132.20$ | | | |
| $R_3= -74.72$ | $D_2=1.79$ | 1.5795 | 41.0 |
| $R_4= +38.16$ | | | |
| $R_5= +38.16$ | $D_3=6.13$ | 1.6110 | 58.8 |
| $R_6= -125.28$ | | | | in which R is the radius of curvature of the refracting surface, D is the axial thickness of the lens element between the refracting surfaces, N_D is the refractive index for line D of the solar spectrum, the Abbé number V is the well known reciprocal dispersion-ratio, and an air lens results from the difference of the stated curvatures of the adjacent refracting surfaces 2 and 3 and their stated edge contact.

2. A three-element objective for telescopes and the like, comprising a front convergent crown element, a central divergent flint element, and a rear convergent crown element in axial alignment with all adjacent edges touching, having the power of the front element between 1.0 and 1.5 times that of the whole objective, having the N_D for each crown element being higher than that for the flint element, and having the second element's first surface constructed to have a radius of curvature different from that of the second surface of the first element to provide an air lens, N_D being the refractive index for the line D of the solar spectrum.

3. A three-element objective for telescopes and the like, comprising a front convergent dense barium crown element, a central divergent light flint element, and a rear convergent dense barium crown element in axial alignment with all adjacent edges touching, having the power of the front element between 1.0 and 1.5 times that of the whole objective, having the front element composed of a glass whose N_D is greater than 1.60, and whose second radius of curvature is at least 1.5 times its first radius of curvature, and having the second element's front surface constructed to have a radius of curvature different from that of the second surface of the first element to provide an air lens, N_D being the refractive index for the line D of the solar spectrum.

4. The objective for telescopes and the like set forth in claim 3, in which said central element is biconcave with its second radius of curvature between 0.45 and 0.55 times its first, and in which said rear element has its second radius of curvature between 3.0 and 3.7 times its first radius of curvature.

5. An objective for telescopes and the like, comprising a front convergent crown element made of glass of $N_D$ greater than 1.60 with a power between 1.0 and 1.3 times the power of the complete system, a central divergent flint element made of glass of $N_D$ less than 1.60, and a convergent rear crown element made of glass of $N_D$ greater than 1.60, with all the adjacent edges of the elements touching, $N_D$ being the refractive index for the line D of the solar spectrum.

6. An objective for telescopes and the like, comprising a front convergent crown element made of glass of $N_D$ greater than 1.60, a central divergent flint element made of glass of $N_D$ less than 1.60, and a convergent rear crown element made of glass of $N_D$ greater than 1.60, with said central and rear elements constructed to have the difference of their powers within 22 per cent numerically of the total power of the objective, with all the adjacent edges of the elements touching, $N_D$ being the refractive index for the line D of the solar spectrum.

7. An objective for telescopes and the like, comprising at least three elements, with all elements touching at adjacent edges and an over-all thickness less than one-half the diameter of the objective, said elements being constructed of crown and flint glasss substantially A and B respectively to have the difference of the V-values greater than 17.5, to have such power that $$\left[\frac{P_A}{P_B}+\frac{V_A}{P_B}\right]<0.010$$

and to have $$\frac{1}{V_A-V_B}\left[\frac{V_A}{N_A}-\frac{V_B}{N_B}\right]<0.65$$

in which the Abbé number V is the reciprocal dispersion-ratio, N is the refractive index for the line D of the solar spectrum, and P is the total power of all lenses of glass A or B.

8. The objective set forth in claim 7, which is composed of three elements with the front element convergent and made of crown glass with 1.0 to 1.3 times the power of the whole objective.

JOHN R. MILES.

REFERENCES CITED

The following references are of record in the file of this patent:

UNITED STATES PATENTS

| Number | Name | Date |
|---|---|---|
| 2,158,507 | Konig | May 16, 1939 |
| 2,158,201 | Schade | May 16, 1939 |
| 2,158,179 | Frederick et al. | May 16, 1939 |
| 2,325,275 | Rayton | July 27, 1943 |
| 540,339 | Taylor | June 4, 1895 |
| 415,040 | Hastings | Nov. 12, 1889 |
| 1,616,751 | Konig | Feb. 8, 1927 |

FOREIGN PATENTS

| Number | Country | Date |
|---|---|---|
| 22,276 | British | 1914 |